US008332255B2

(12) United States Patent
Chu et al.

(10) Patent No.: US 8,332,255 B2
(45) Date of Patent: Dec. 11, 2012

(54) SENSOR-INTEGRATED MIRROR FOR DETERMINING CONSUMER SHOPPING BEHAVIOR

(75) Inventors: Maurice K. Chu, Burlingame, CA (US); James M. A. Begole, Los Altos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 225 days.

(21) Appl. No.: 12/614,922

(22) Filed: Nov. 9, 2009

(65) Prior Publication Data

US 2011/0112890 A1      May 12, 2011

(51) Int. Cl.
*G06Q 10/00* (2006.01)
(52) U.S. Cl. ............ 705/7.29; 705/7.31; 705/7.33; 382/111; 382/325
(58) Field of Classification Search ............. 705/1.1, 705/7, 10, 14.4, 27
See application file for complete search history.

(56) References Cited

U.S. PATENT DOCUMENTS

| 2002/0072952 | A1* | 6/2002 | Hamzy et al. ............ 705/10 |
| 2004/0039592 | A1* | 2/2004 | Shima .................... 705/1 |
| 2005/0010497 | A1* | 1/2005 | Kinjo ..................... 705/27 |
| 2006/0243797 | A1* | 11/2006 | Apte et al. .............. 235/383 |
| 2008/0228577 | A1* | 9/2008 | Decre et al. .............. 705/14 |
| 2011/0040539 | A1* | 2/2011 | Szymczyk et al. .......... 703/6 |

* cited by examiner

*Primary Examiner* — Elizabeth Rosen
(74) *Attorney, Agent, or Firm* — Shun Yao; Park, Vaughan, Fleming & Dowler LLP (57) ABSTRACT

A mirror system includes an image sensor coupled to a mirror, and gathers consumer shopping preferences for merchandise items. During operation, the system gathers one or more sequential images, from the image sensor, of a consumer wearing a first wearable merchandise item in front of the image sensor. Next, the system identifies in the one or more sequential images a first merchandise item being worn by the consumer. Then, the system determines a demographic group associated with the consumer, and detects behavior patterns for the consumer, wherein the behavior pattern indicates an interest level of the consumer for the identified merchandise item. The system then determines a mapping between the identified consumer demographic group and an interest level for the identified merchandise item, and produces a model which encodes the mapping.

21 Claims, 9 Drawing Sheets

SENSOR-INTEGRATED MIRROR FOR DETERMINING CONSUMER SHOPPING BEHAVIOR

BACKGROUND

1. Field

This disclosure is generally related to retail fitting room systems. More specifically, this disclosure is related to a method and apparatus that determines consumer shopping behavior.

2. Related Art

Shopping for clothes, jewelry, or other wearable items is a common activity which can be carried out either online or in physical stores. A common practice in a physical store is to search the inventory for items of interest, select a few for comparison, and try them on to decide which, if any, to purchase. A consumer evaluates the wearable items according to how well they fit physically, and also how well they fit the image of herself that she wants others to perceive. That is, the consumer not only checks whether a garment fits her body, but also whether it fits her style.

Retailers typically attempt to gather consumer buying behavior using point-of-sale (POS) data. Specifically, these retailers monitor the merchandise items purchased by consumers to determine their shopping preferences. The POS data allows retailers to determine what products to sell to their consumers, and to determine how to run their business more effectively.

Unfortunately, POS data captures consumer behavior information only when merchandise items are purchased by consumers. This prevents POS data from capturing consumer shopping behavior that happens before a consumer purchases a merchandise item. Furthermore, POS data is also not capable of capturing a great deal of consumer shopping behavior for merchandise items that are seldom purchased by consumers.

SUMMARY

One embodiment provides a system that gathers consumer shopping preferences for merchandise items. During operation, the system gathers one or more sequential images, from an image sensor, of a consumer wearing a first wearable merchandise item in front of the image sensor. Next, the system identifies in the one or more sequential images a first merchandise item being worn by the consumer. Then, the system determines a demographic group associated with the consumer, and detects behavior patterns for the consumer, such that the behavior pattern indicates an interest level of the consumer for the identified merchandise item. The system then determines a mapping, which can be deterministic, non-deterministic, or probabilistic, between the identified consumer demographic group and an interest level for the identified merchandise item, and produces a model which encodes the mapping.

In some embodiments, the system analyzes the one or more sequential images to identify one or more additional merchandise items considered by the consumer in combination with the first item. Then, the system determines one or more matching characteristics between the first and the additional merchandise items, and determines a preference of the consumer for the combination of merchandise items based at least on the determined matching characteristics.

In some embodiments, the system detects the behavior patterns for the consumer by detecting one or more of the following: an eye gaze direction, an eye gesture, a body gesture, a facial expression, a time duration associated with the direction of an eye gaze, and a time duration of the consumer wearing the merchandise item.

In some embodiments, the system detects the behavior patterns for the consumer by determining a portion of the merchandise item being gazed upon by the consumer based in part on the consumer's eye gaze direction. The system then determines an interest level of the consumer for the portion of the merchandise item.

In some embodiments, the system detects the behavior patterns for the consumer by determining a correlation between two merchandise items that are worn simultaneously by the consumer.

In some embodiments, the system identifies a merchandise item by performing one or more of the following operations: scanning a radio-frequency identification (RFID) tag, scanning a barcode, and extracting features from the one or more sequential images.

In some embodiments, the system determines a demographic group associated with a consumer by determining one or more of: an age, a gender, an ethnicity, a physical appearance, a body characteristic, and a market segment.

In some embodiments, the system displays to the consumer a set of images of the consumer wearing a variety of wearable merchandise items, and the system gathers consumer shopping preferences by analyzing a second set of images of the consumer viewing the set of displayed images.

In some embodiments, the system displays to a consumer a set of images of a variety of wearable merchandise items that are overlaid on an image of the consumer, and the system gathers consumer shopping preferences by analyzing a second set of images of the consumer viewing the set of displayed images.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Overview

Embodiments of the present invention provide a mirror system, which includes methods and apparatuses for gathering valuable consumer shopping preferences from a consumer while the consumer is considering whether to purchase a merchandise item. More specifically, the mirror system can determine an interest level that a consumer has for a given merchandise item, or for a feature of the merchandise item, before the consumer purchases the merchandise item. The mirror system can also determine an interest level that a consumer has for a merchandise item that the consumer ultimately does not purchase.

For example, a consumer shopping at a retail store may repeatedly try on a set of clothing articles, jewelry pieces, or other wearable merchandise items (e.g., eyeglasses, sunglasses, handbags, etc.) to assess how these merchandise items look on the consumer. If the consumer wishes to compare several hats, or pairs of earrings, the consumer may hold up different merchandise items in various ways in front of a mirror of the mirror system. Furthermore, the consumer may iterate back and forth between multiple merchandise items to determine which items the consumer likes best, and the consumer may even generate facial expressions and physical gestures that indicate the consumer's interest level for a merchandise item.

In some embodiments, the mirror system can monitor the behavior of a consumer to determine shopping preferences for the consumer as the consumer is viewing merchandise items in front of the mirror. For example, the system can determine a set of merchandise items that a consumer combines into an outfit, and the system can determine that a consumer prefers one merchandise item over another. Furthermore, the system can determine a characteristic of a merchandise item that a consumer likes or dislikes, based in part on any facial expressions, eye gazes, and physical gestures that the consumer makes.

Figure 1:
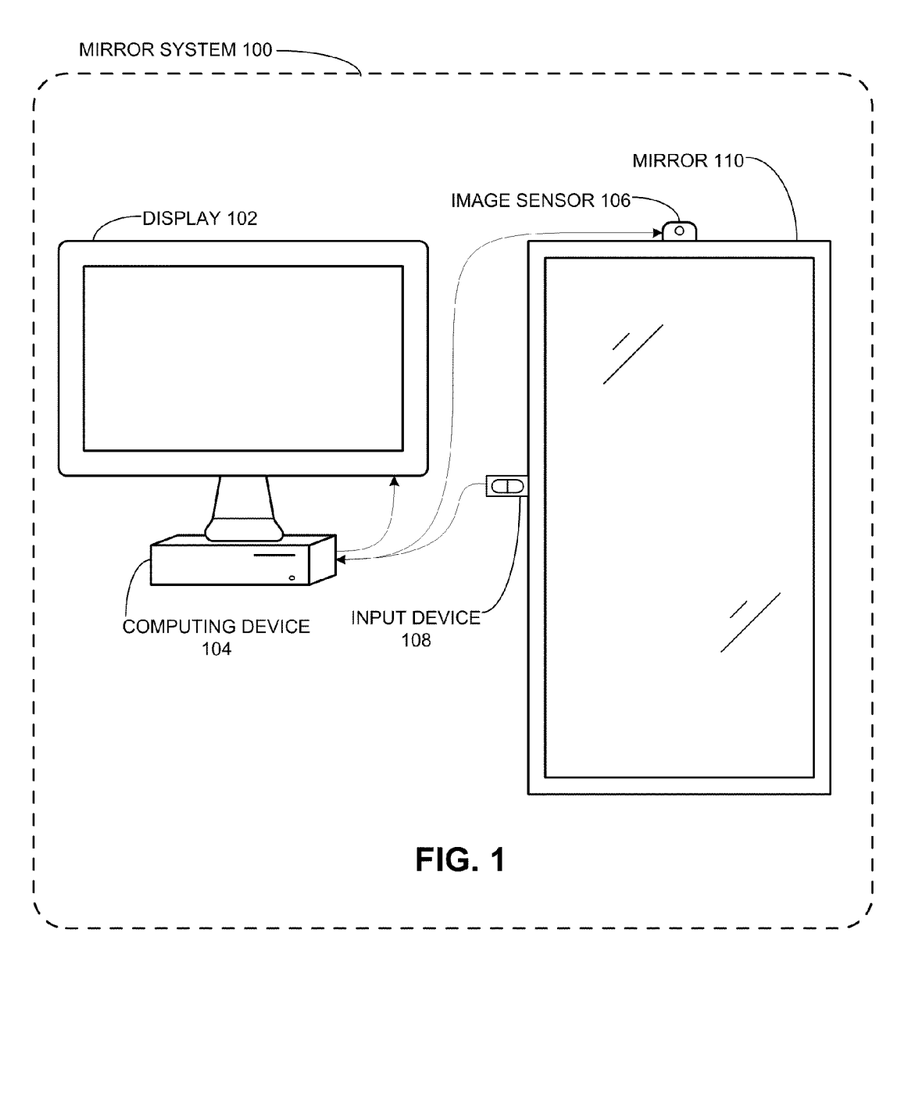
FIG. 1 illustrates a mirror system in accordance with an embodiment.

FIG. 1 illustrates a mirror system in accordance with an embodiment. Specifically, mirror system 100 includes a mirror 110, a computing device 104, and an image sensor 106 coupled to computing device 104. The mirror system can also include a display 102 and an input device 108 that are also coupled to computing device 104. In some embodiments, mirror system 100 can also include one or more other sensors that are coupled to computing device 104, such as a radio-frequency identifier (RFID) scanner, a barcode scanner, and a microphone. In some embodiments, computing device 104 can be integrated into image sensor 106, or can be integrated into display 102. Furthermore, image sensor 106 can be mechanically coupled to the perimeter of mirror 110, integrated into the surface area of mirror 110, or placed near mirror 110 to capture images of a consumer looking at his/her reflection on display 102.

During operation, image sensor 106 is configured to capture images of a consumer trying on various wearable merchandise items in front of mirror 110, and to communicate the captured images to computing device 104. Then, computing device 104 can automatically extract data about a consumer's interest in products by identifying the merchandise items and detecting the consumer's behavior patterns in the captured images. Note that the information gathered by computing device 104 includes information that does not exist in point-of-sale (POS) data when a consumer ultimately does not purchase a merchandise item. Furthermore, the information gathered by computing device 104 is unique from POS data because consumers reveal information about their decision-making process when trying on merchandise items in front of mirror 110 that is not expressed when the consumer purchases an item.

In some embodiments, mirror system 100 can gather information about a consumer's shopping behavior and preferences, such as the identity of a merchandise item (e.g., "AGB Sleeveless Belted Ponte Sheath Dress, size 2, in velvet red"), a time duration that elapsed while the consumer tried on the merchandise item, and the identity and/or demographic of the consumer. The information gathered by mirror system 100 can be correlated with sales information from a POS system to compute conversion rates, such as "trying on"-to-"buy" and "trying on"-to-"discard" conversions, and other statistics such as the average amount of time an item was tried on. Merchants can use these statistics about products to adjust pricing models, or to offer discounts to consumers who indicated interest in a merchandise item but did not purchase the merchandise item. Furthermore, merchants can also use these statistics to determine how to adjust their supply-chain process.

For example, a merchant can determine that consumers dislike a given merchandise item when the consumers try on the merchandise item for less than a threshold time duration. Also, a merchant may decide to lower the price of a merchandise item if the merchant determines that a significant number of consumers try on the merchandise item for more than a threshold time duration, but did not buy the merchandise item.

In some embodiments, computing device 104 can present on display 102 images of the consumer wearing a merchandise item, and the consumer can use input device 108 to cycle through the images. This can allow the user to play-back images of the consumer wearing a variety of merchandise items as the consumer decides on a merchandise item to purchase. Furthermore, computing device 104 can present on display 102 a variety of other merchandise items that may be of interest to the consumer. For example, computing device 104 may determine that a consumer is shopping for athletic apparel, and can present advertisement images of athletic apparel that closely resembles the merchandise items that the consumer is trying on.

In some embodiments, mirror system 100 configures display 102 to function like a mirror by displaying the images captured by image sensor 106, thus replacing mirror 110 with display 102. In this configuration, image sensor 106 is mechanically coupled to the perimeter of display 102, integrated into display 102, or placed near display 102 to capture images of a consumer looking at him/herself on display 102. Furthermore, to simulate a mirror, computing device 104 can flip the images captured by image sensor 106 before displaying the flipped images on display 102.

Figure 2A:
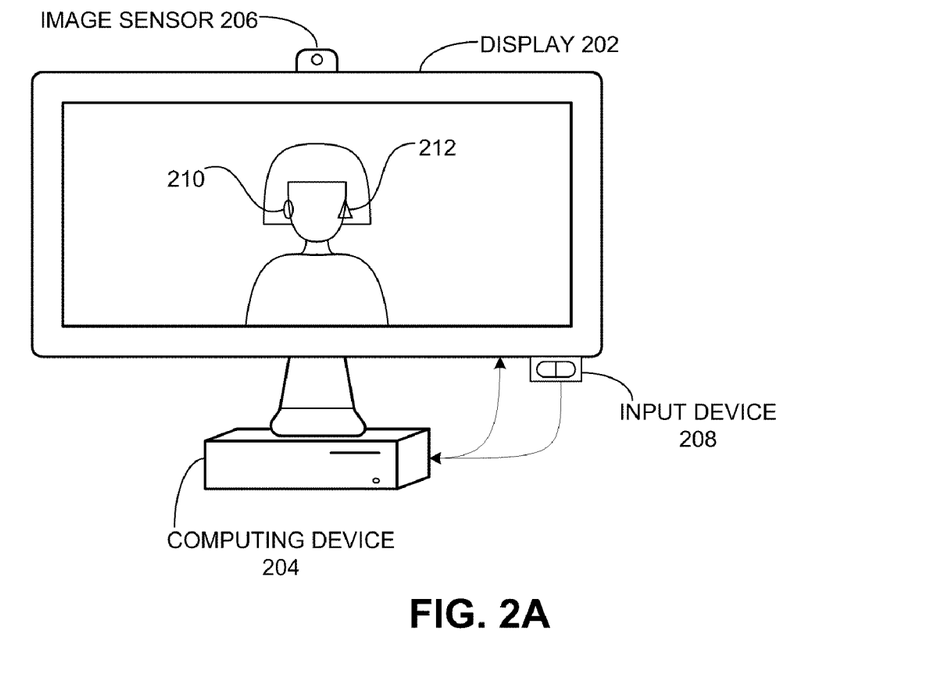
FIG. 2A illustrates an image of a consumer wearing multiple merchandise items presented on a display in accordance with an embodiment.

FIG. 2A illustrates an image of a consumer wearing multiple merchandise items presented on a display in accordance with an embodiment. Specifically, image sensor 206 can capture images of a consumer wearing a combination of merchandise items (e.g., merchandise items 210-212), and computing device 204 can present these images on display 202 for the consumer as they are captured. In some embodiments, computing device 204 can detect and identify multiple merchandise items that a consumer is wearing simultaneously. Furthermore, the consumer can use an input device 208 to cycle through a set of captured images to view the merchandise items after the consumer is not wearing them any longer.

Figure 2B:
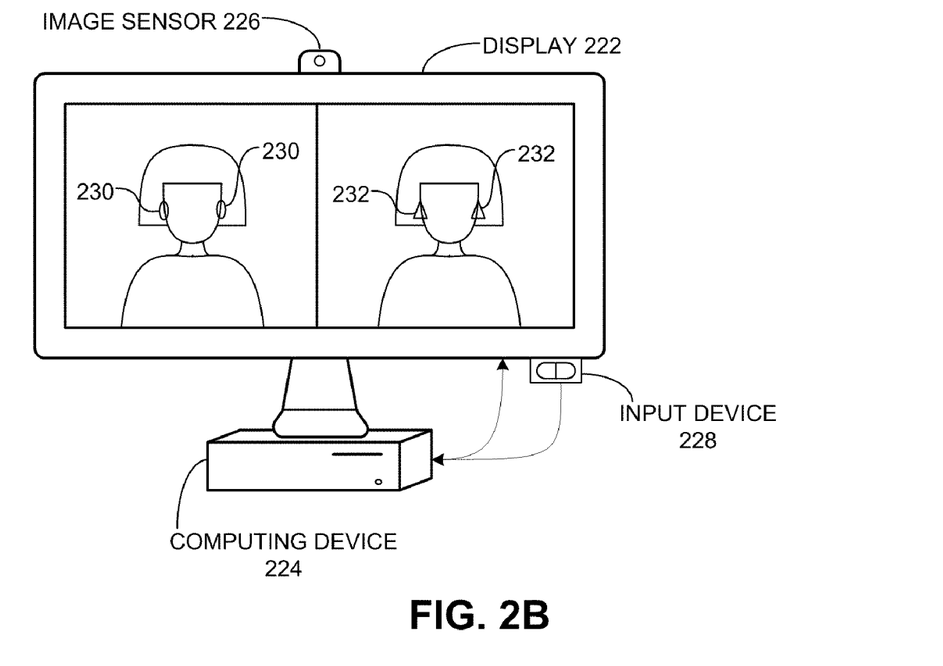
FIG. 2B illustrates two images of a consumer wearing merchandise items presented on a display in accordance with an embodiment.

FIG. 2B illustrates two images of a consumer wearing merchandise items presented on a display in accordance with an embodiment. Specifically, image sensor 226 can capture images of a consumer wearing different combinations of merchandise items over time (e.g., merchandise items 230 and 232), and computing device 224 can present these images on display 222 for the consumer. Then, the consumer can use an input device 228 to select multiple captured images to view simultaneously to compare how each combination of merchandise items looks on the consumer (e.g., after the consumer is not wearing one combination of merchandise items any longer). Note that the consumer can configure display 222 to display a number of previously captured images on one portion of the display screen (e.g., the left side of display 222 displaying merchandise item 230). Furthermore, the consumer can configure display 222 to display live images on the remainder of the display screen as they are captured by image sensor 226 (e.g., the right side of display 222 displaying merchandise item 232).

Figure 3:
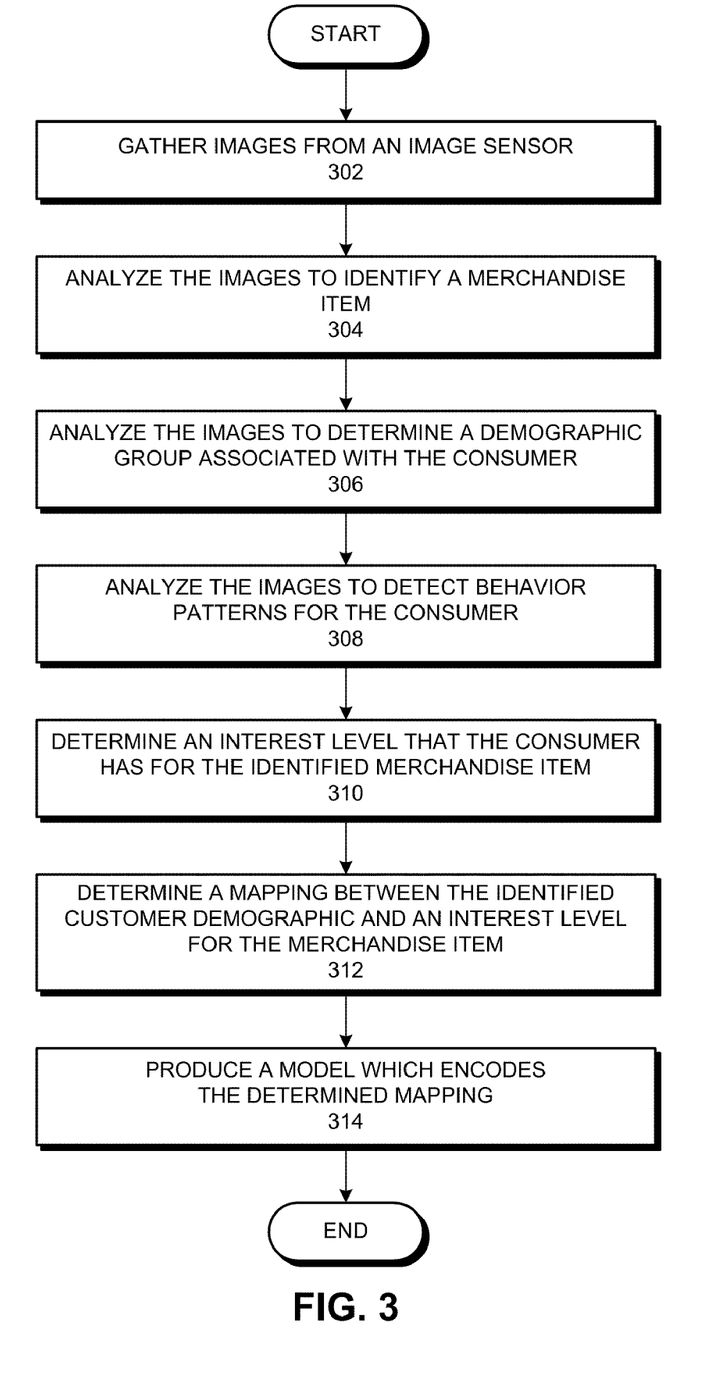
FIG. 3 presents a flow chart illustrating a process for determining a consumer interest level for a merchandise item in accordance with an embodiment.

FIG. 3 presents a flow chart illustrating a process for determining a consumer interest level for a merchandise item in accordance with an embodiment. The process can be performed on a computer system comprising a storage device that stores instructions that implement the process, and a processing unit that executes the stored instructions.

The system can begin by gathering images from an image sensor (operation 302), and analyzing the images to identify a merchandise item (operation 304). The system can also analyze the images to determine a demographic group associated with the consumer (operation 306), and can further analyze the images to detect behavior patterns for the consumer (operation 308). For example, the system can analyze the images to detect consumer behavior patterns such as an eye gaze direction, an eye gesture, a body gesture, a facial expression, a time duration for an eye gaze direction, and a time duration of the consumer wearing the merchandise item. Next, the system can determine an interest level that the consumer has for the identified item based in part on the consumer behavior (operation 310). The system can then determine a mapping between the identified consumer demographic and an interest level for the merchandise item (operation 312), and produce a model which encodes the mapping (operation 314).

Figure 4:
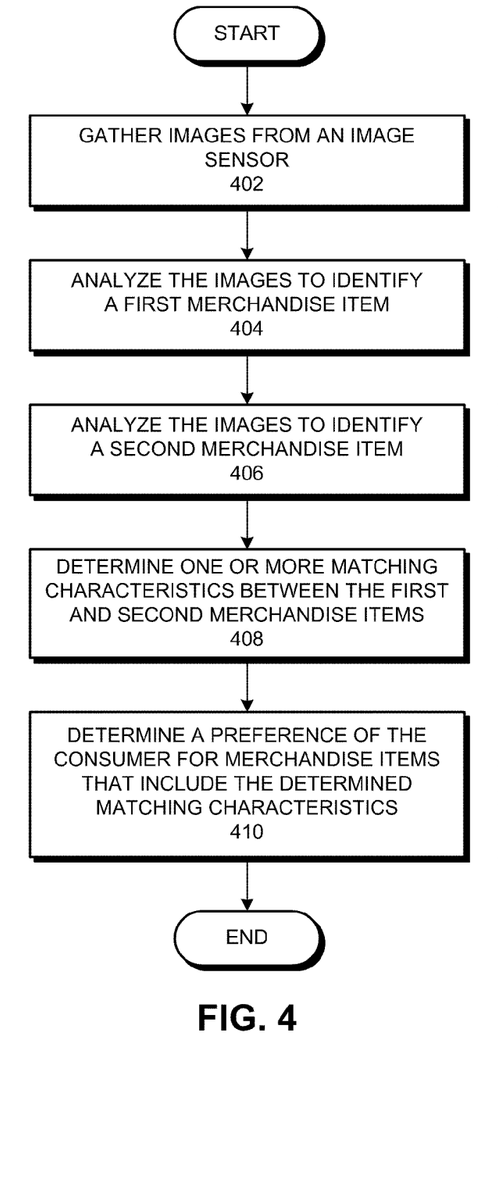
FIG. 4 presents a flow chart illustrating a process for determining a merchandise item characteristic that a consumer has a preference for in accordance with an embodiment.

FIG. 4 presents a flow chart illustrating a process for determining a merchandise item characteristic that a consumer has a preference for in accordance with an embodiment. The system can begin by gathering images from an image sensor (operation 402), and analyzing the images to identify a first merchandise item (operation 404). The system then analyzes the images to identify a second merchandise item (operation 406), and determining one or more matching characteristics between the first and second merchandise items (operation 408). The system then determines a preference of the consumer for merchandise items that include the determined matching characteristics (operation 410).

Figure 5:
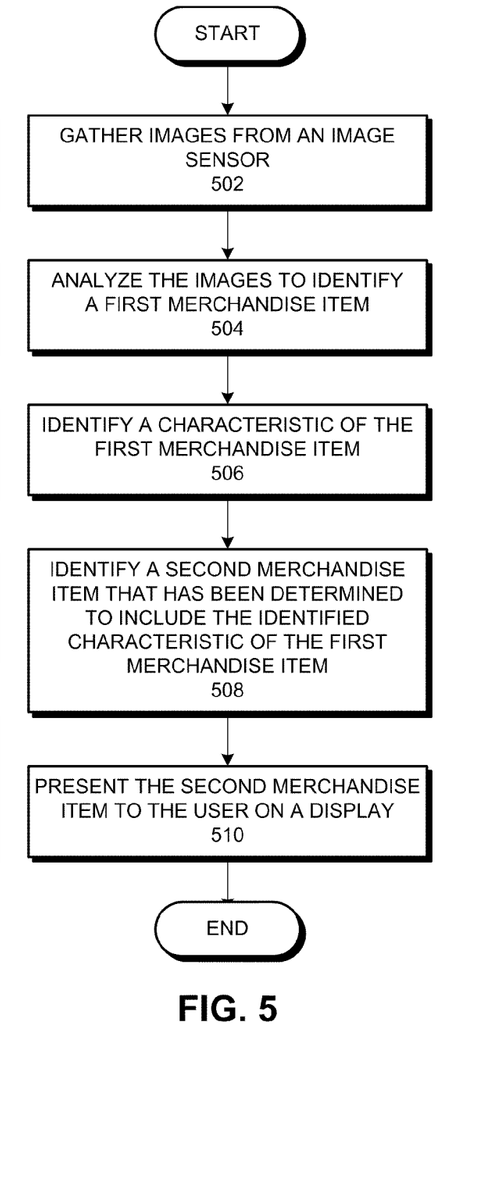
FIG. 5 presents a flow chart illustrating a process for presenting to a consumer a merchandise item that includes a characteristic that the consumer has a preference for in accordance with an embodiment.

FIG. 5 presents a flow chart illustrating a process for presenting to a consumer a merchandise item that includes a characteristic that the consumer has a preference for in accordance with an embodiment. The system can begin by gathering images from an image sensor (operation 502), and analyzing the images to identify a merchandise item that the consumer is wearing (operation 504). Next, the system identifies a characteristic of the identified merchandise item (operation 506), and identifies a second merchandise item that has been determined to include the identified characteristic of the merchandise item that the consumer is wearing (operation 508). The system can then present the second merchandise item to the user on a display (operation 510). For example, if the system determines that a consumer wears several gold jewelry items in front of a mirror, the system can present other similar gold jewelry items to the consumer on a neighboring image display.

Figure 6:
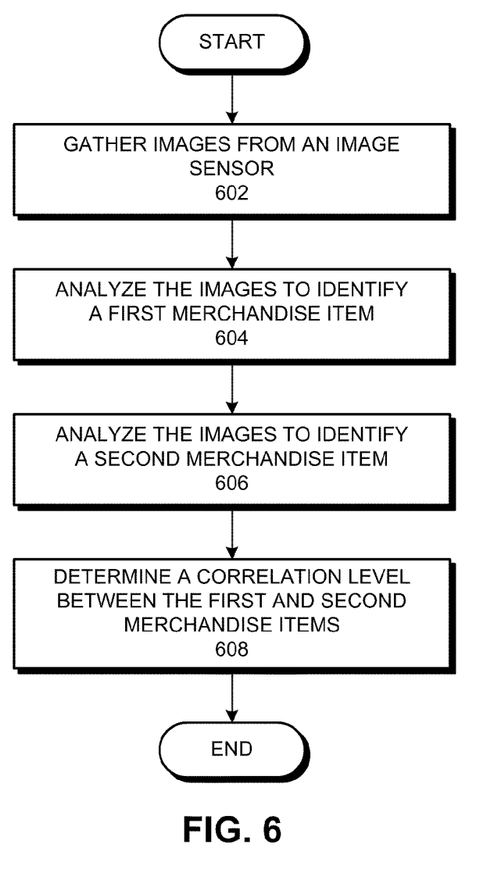
FIG. 6 presents a flow chart illustrating a process for determining a correlation between two merchandise items in accordance with an embodiment.

FIG. 6 presents a flow chart illustrating a process for determining a correlation between two merchandise items in accordance with an embodiment. The system can begin by gathering images from an image sensor (operation 602), and analyzing the images to identify a merchandise item that the consumer is wearing (operation 604). The system also analyzes the images to determine a second merchandise item that the consumer is wearing (operation 606), and determines a correlation level between the first and second merchandise items (operation 608).

Note that the system can determine a correlation level between two merchandise items when a consumer wears the two merchandise items simultaneously, or when the consumer wears the two merchandise items at two different points in time during a single session in front of a mirror. In some embodiments, the system can determine that two merchandise items are correlated within a given consumer demographic when multiple consumers associated with that demographic try on both merchandise items within a common session in front of the mirror. For example, the system may not recognize that the two merchandise items are correlated until a predetermined threshold of consumers of the given consumer demographic try on the two merchandise items in the same session. Then, as more consumers associated with that demographic select the combination of merchandise items, the system can increase the correlation level between the two merchandise items.

Figure 7:
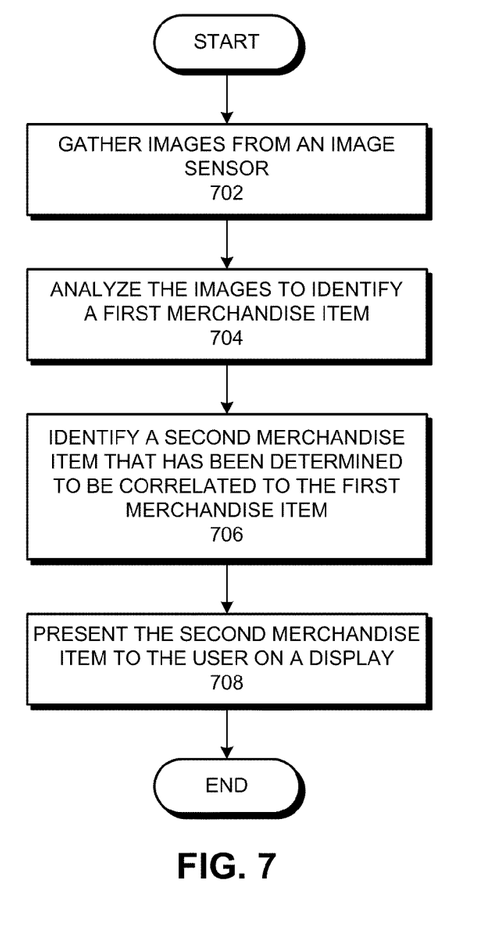
FIG. 7 presents a flow chart illustrating a process for presenting to a consumer a merchandise item correlated to a merchandise item that the consumer is wearing in accordance with an embodiment.

FIG. 7 presents a flow chart illustrating a process for presenting to a consumer a merchandise item correlated to a merchandise item that the consumer is wearing in accordance with an embodiment. The system can begin by gathering images from an image sensor (operation 702), and analyzing the images to identify a merchandise item that the consumer is wearing (operation 704). Next, the system can identify a second merchandise item that has been determined to be correlated to the first merchandise item (operation 706). The system can then present the second merchandise item to the consumer on a neighboring display (operation 708). For example, if the system determines that consumers associated with a given demographic have a preference for khaki pants and polo shirts, the system can present polo shirts to a consumer of the given demographic when the consumer wears khaki pants in front of the mirror.

Figure 8:
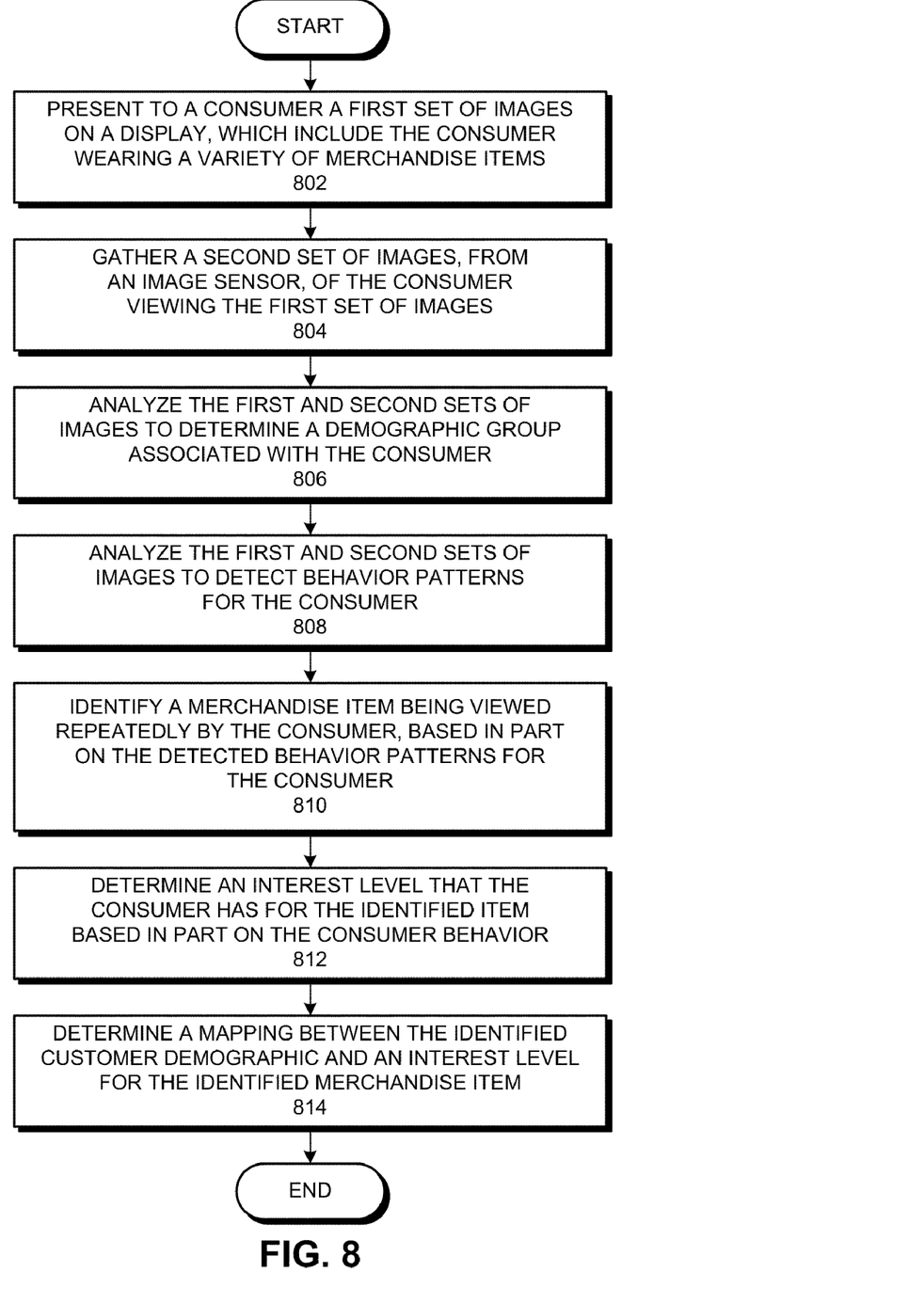
FIG. 8 presents a flow chart illustrating a process for determining a consumer interest level for a merchandise item that the consumer wore previously in front of an image sensor in accordance with an embodiment.

FIG. 8 presents a flow chart illustrating a process for determining a consumer interest level for a merchandise item that the consumer wore previously in front of an image sensor in accordance with an embodiment. The system can begin by presenting to a consumer a set of images on the display, which include the consumer wearing a variety of merchandise items (operation 802). The system can also gather a second set of images from an image sensor of the consumer viewing the first set of images (operation 804). The system can analyze the first and second sets of images to determine a demographic group associated with the consumer (operation 806), and to detect behavior patterns for the consumer (operation 808). For example, the system can analyze the order and number of times that each of the first set of images was viewed by the consumer. Furthermore, the system can analyze the second set of images to detect consumer behavior patterns such as an eye gaze direction, an eye gesture, a body gesture, a facial expression, a time duration for an eye gaze direction, and a time duration of the consumer viewing an image of a merchandise item.

Next, the system can identify a merchandise item being viewed repeatedly by the consumer, based in part on the detected behavior patterns for the consumer (operation 810), and can determine an interest level that the consumer has for the identified item based in part on the consumer behavior (operation 812). The system can then determine a mapping between the identified consumer demographic and an interest level for the identified merchandise item (operation 814).

Figure 9:
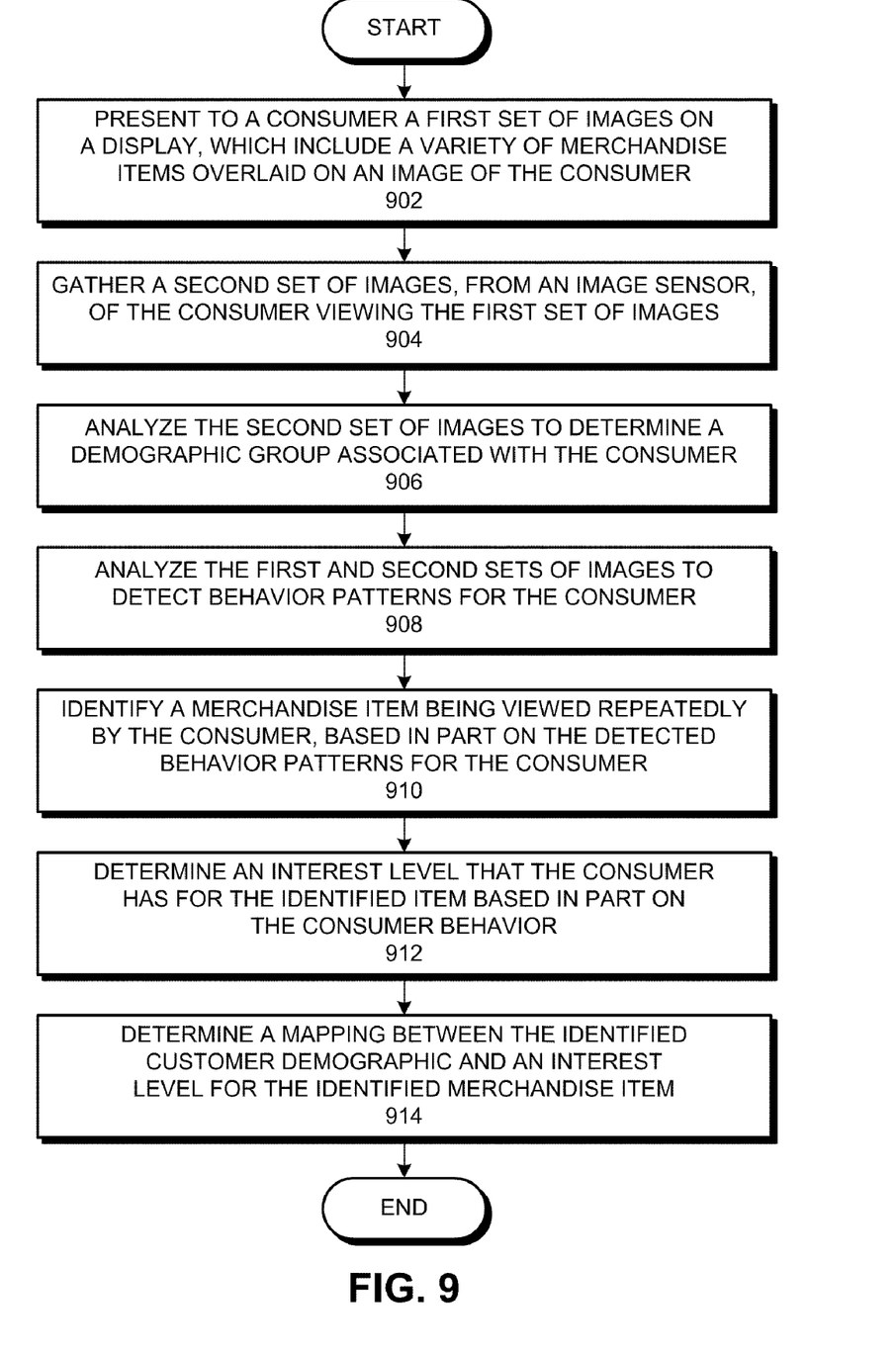
FIG. 9 presents a flow chart illustrating a process for determining a consumer interest level for a merchandise item presented on a display as an overlay over an image of the consumer in accordance with an embodiment.

FIG. 9 presents a flow chart illustrating a process for determining a consumer interest level for a merchandise item presented on a display as an overlay over an image of the consumer in accordance with an embodiment. The system can begin by presenting to a consumer a set of images on the display, which include a variety of merchandise items overlaid on an image of the consumer (operation 902). The system can also gather a second set of images from an image sensor of the consumer viewing the first set of images (operation 904). The system can analyze the second set of images to determine a demographic group associated with the consumer (operation 906), and can analyze the first and second sets of images to detect behavior patterns for the consumer (operation 908). For example, the system can analyze the order and number of times that each of the first set of images was viewed by the consumer. Furthermore, the system can analyze the second set of images to detect consumer behavior patterns such as an eye gaze direction, an eye gesture, a body gesture, a facial expression, a time duration for an eye gaze direction, and a time duration of the consumer viewing an image of a merchandise item.

Next, the system can identify a merchandise item being viewed repeatedly by the consumer, based in part on the detected behavior patterns for the consumer (operation 910), and can determine an interest level that the consumer has for the identified item based in part on the consumer behavior (operation 912). The system can then determine a mapping between the identified consumer demographic and an interest level for the identified merchandise item (operation 914).

Figure 10:
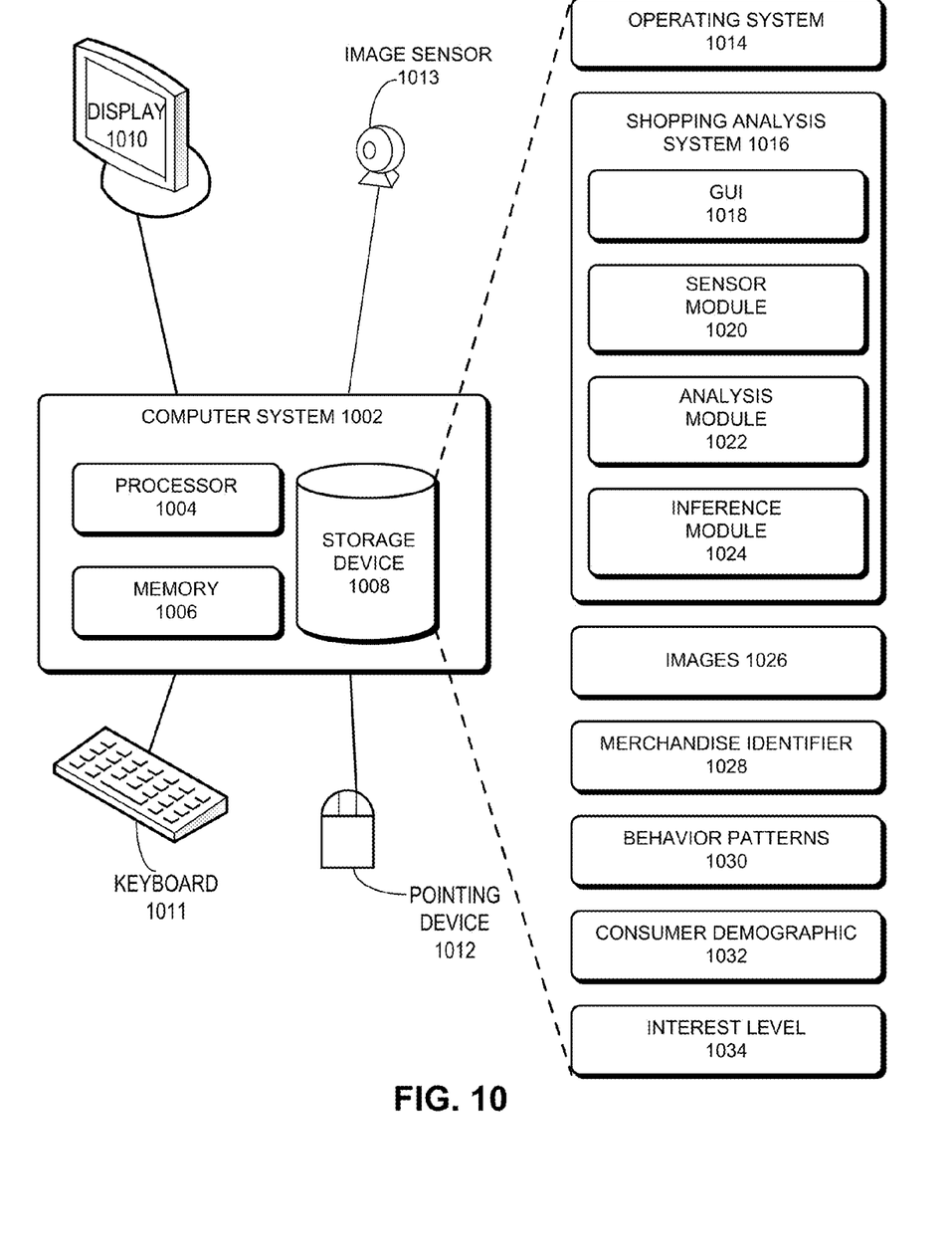
FIG. 10 illustrates an exemplary computer system that facilitates gathering consumer shopping preferences and behavior in accordance with an embodiment of the present invention.

FIG. 10 illustrates an exemplary computer system that facilitates gathering consumer shopping preferences and behavior in accordance with an embodiment of the present invention. Computer system 1002 includes a processor 1004, a memory 1006, and a storage device 1008. Furthermore, computer system 1002 can be coupled to a display device 1010, a keyboard 1011, a pointing device 1012, and/or an image sensor 1013.

Storage device 1008 stores at least one of an operating system 1014, a shopping analysis system 1016, a set of images 1026, a merchandise identifier 1028, behavior patterns 1030, consumer demographic 1032, and interest level 1034. Furthermore, shopping analysis system 1016 can include a graphical user interface (GUI) 1018, a sensor module 1020, an analysis module 1022, and an inference module 1024.

During operation, computer system 1002 loads shopping analysis system 1016 from storage device 1008 into memory 1006, and executes shopping analysis system 1016 on processor 1004. Sensor module 1020 can receive a sequence of one or more images 1026 of a consumer wearing a merchandise item in front of image sensor 1013. Then, analysis module 1022 can determine a merchandise identifier 1028 (e.g., merchandise classification, manufacturer, color, etc.) of a merchandise item that a consumer is wearing. Analysis module 1022 can further detect behavior patterns 1030 and consumer demographic 1032 for the consumer based in part on images 1026. Inference module 1024 can then determine an interest level 1034 that consumers of consumer demographic 1032 have for a merchandise item associated with merchandise identifier 1028.

In some embodiments, shopping analysis system 1016 can display images of the consumer wearing merchandise items on display 1010 for the consumer. In other embodiments, shopping analysis system 1016 can identify other merchandise items that are of interest to members of consumer demographic 1032, and can display advertisements for the identified merchandise items on display 1010.

Figure 11:
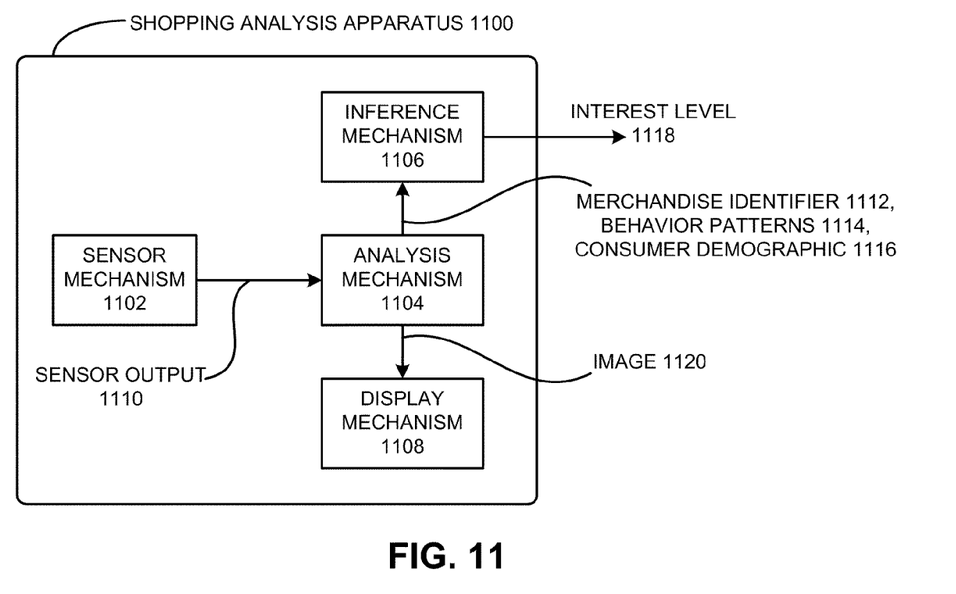
FIG. 11 illustrates an exemplary apparatus that facilitates gathering consumer shopping preferences and behavior in accordance with an embodiment of the present invention.

FIG. 11 illustrates an exemplary apparatus that facilitates gathering consumer shopping preferences and behavior in accordance with an embodiment of the present invention. Apparatus 1100 can comprise a number of mechanisms which may communicate with one another via a wired or wireless communication channel. Apparatus 1100 may be realized using one or more integrated circuits, and it may be integrated in a computer system, or it may be realized as a separate device which is capable of communicating with other computer systems and/or devices. Specifically, shopping analysis apparatus 1100 can include a sensor mechanism 1102, an analysis mechanism 1104, an inference mechanism 1106, and a display mechanism 1108. Sensor mechanism 1102 can include one or more of: an image sensor, an RFID reader, a barcode scanner, and a microphone.

During operation, sensor mechanism 1102 can generate a sensor output 1110 (e.g., a sequence of one or more images of a consumer wearing a merchandise item in front of an image sensor). Sensor output 1110 can include: an image of a consumer wearing a merchandise item; an RFID tag reading; a barcode scan; and an audible utterance.

Then, analysis mechanism 1104 can determine a merchandise identifier 1112 (e.g., name, color, etc.) of a merchandise item that a consumer is wearing, behavior patterns 1114, and a consumer demographic 1116 for the consumer based in part on sensor output 1110. Inference mechanism 1106 can then determine an interest level 1118 that consumers of consumer demographic 1116 have for a merchandise item associated with merchandise identifier 1112.

In some embodiments, shopping analysis apparatus 1100 can display images of the consumer wearing merchandise items on display mechanism 1108 for the consumer. In other embodiments, shopping analysis apparatus 1100 can identify other merchandise items that are of interest to members of consumer demographic 1116, and can display advertisements for the identified merchandise items on display mechanism 1108.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for gathering consumer shopping preferences for merchandise items, the method comprising:
    gathering one or more sequential images of a consumer trying on a first wearable merchandise item in front of an image sensor at a point-of-decision location, wherein the merchandise item is not purchased later by the consumer;
    identifying, by the computer, the first merchandise item being worn by the consumer based on the images;
    determining, by the computer, a demographic group associated with the consumer based on the images;
    detecting, by the computer, behavior patterns indicating an interest level of the consumer based at least on information about the consumer's decision-making process from the images associated with the merchandise item that is not later purchased;
    determining, by the computer, a mapping between the identified consumer demographic group and the interest level for the identified merchandise item;
    producing, by the computer, a model which encodes the mapping;
    displaying to the consumer a first set of images of a variety of wearable merchandise items overlaid on an image of the consumer; and
    analyzing, by the computer, a second set of images of the consumer to detect additional behavior patterns of the consumer, wherein the second set of images of the consumer viewing the first set of images are captured by a second image sensor.

2. The computer-implemented method of claim 1, further comprising:
    analyzing the one or more sequential images to identify a second merchandise item considered by the consumer;
    determining one or more matching characteristics between the first and second merchandise items; and
    determining a preference of the consumer for merchandise items based at least on the determined matching characteristics.

3. The computer-implemented method of claim 1, wherein detecting the behavior patterns for the consumer comprises detecting one or more of the following: an eye gaze direction, an eye gesture, a body gesture, a facial expression, a time duration associated with the direction of an eye gaze, and a time duration of the consumer wearing the merchandise item.

4. The computer-implemented method of claim 3, wherein detecting the behavior patterns for the consumer further comprises:
    determining a portion of the merchandise item being gazed upon by the consumer based in part on the determined eye gaze direction; and
    determining an interest level of the consumer for the portion of the merchandise item.

5. The computer-implemented method of claim 3, wherein detecting the behavior patterns for the consumer further comprises:
    determining a correlation between two merchandise items that are worn simultaneously by the consumer.

6. The computer-implemented method of claim 1, wherein identifying the merchandise item comprises performing one or more of the following operations: scanning a radio-frequency identification (RFID) tag, scanning a barcode, and extracting a feature from the one or more sequential Images.

7. The computer-implemented method of claim 1, wherein determining the demographic group associated with the consumer includes determining one or more of: an age, a gender, an ethnicity, a physical appearance, a body characteristic, and a market segment.

8. A non-transitory computer-readable storage medium storing instructions that when executed by a computer cause the computer to perform a method for gathering consumer shopping preferences for merchandise items, the method comprising:
    gathering one or more sequential images of a consumer trying on a first wearable merchandise item in front of an image sensor at a point-of-decision location, wherein the merchandise item is not purchased later by the consumer;
    identifying the first merchandise item being worn by the consumer based on the images;
    determining a demographic group associated with the consumer based on the images;
    detecting behavior patterns indicating an interest level of the consumer based at least on information about the consumer's decision-making process from the images associated with the merchandise item that is not later purchased;
    determining a mapping between the identified consumer demographic group and the interest level for the identified merchandise item;
    producing a model which encodes the mapping;
    displaying to the consumer a first set of images of a variety of wearable merchandise items overlaid on an image of the consumer; and
    analyzing a second set of images of the consumer to detect additional behavior patterns of the consumer, wherein the second set of images of the consumer viewing the first set of images are captured by a second image sensor.

9. The non-transitory computer-readable storage medium of claim 8, further comprising:
   analyzing the one or more sequential images to identify a second merchandise item considered by the consumer;
   determining one or more matching characteristics between the first and second merchandise items; and
   determining a preference of the consumer for merchandise items based at least on the determined matching characteristics.

10. The non-transitory computer-readable storage medium of claim 8, wherein detecting the behavior patterns for the consumer comprises detecting one or more of the following: an eye gaze direction, an eye gesture, a body gesture, a facial expression, a time duration associated with the direction of an eye gaze, and a time duration of the consumer wearing the merchandise item.

11. The non-transitory computer-readable storage medium of claim 10, wherein detecting the behavior patterns for the consumer further comprises:
   determining a portion of the merchandise item being gazed upon by the consumer based in part on the determined eye gaze direction; and
   determining an interest level of the consumer for the portion of the merchandise item.

12. The non-transitory computer-readable storage medium of claim 10, wherein detecting the behavior patterns for the consumer further comprises:
   determining a correlation between two merchandise items that are worn simultaneously by the consumer.

13. The non-transitory computer-readable storage medium of claim 8, wherein identifying the merchandise item comprises performing one or more of the following operations: scanning a radio-frequency identification (RFID) tag, scanning a barcode, and extracting a feature from the one or more sequential images.

14. The non-transitory computer-readable storage medium of claim 8, wherein determining the demographic group associated with the consumer includes determining one or more of: an age, a gender, an ethnicity, a physical appearance, a body characteristic, and a market segment.

15. An apparatus for gathering consumer shopping preferences for merchandise items, comprising:
   a computer system including a processor configured to:
      gather one or more sequential images of a consumer trying on a first wearable merchandise item in front of an image sensor at a point-of-decision location, wherein the merchandise item is not purchased later by the consumer;
      identify the first merchandise item being worn by the consumer based on the images;
      determine a demographic group associated with the consumer based on the images;
      detect behavior patterns indicating an interest level of the consumer based at least on information about the consumer's decision-making process from the images associated with the merchandise item that is not later purchased;
      determine a mapping between the identified consumer demographic group and the interest level for the identified merchandise item;
      produce a model which encodes the mapping;
      display to the consumer a first set of images of a variety of wearable merchandise items overlaid on an image of the consumer; and
      analyze a second set of images of the consumer to detect additional behavior patterns of the consumer, wherein the second set of images of the consumer viewing the first set of images are captured by a second image sensor.

16. The apparatus of claim 15, wherein the computer system is further configured to:
   analyze the one or more sequential images to identify a second merchandise item considered by the consumer;
   determine one or more matching characteristics between the first and second merchandise items; and
   determine a preference of the consumer for merchandise items based at least on the determined matching characteristics.

17. The apparatus of claim 15, wherein while detecting the behavior patterns for the consumer, the computer system is configured to detect one or more of the following: an eye gaze direction, an eye gesture, a body gesture, a facial expression, a time duration associated with the direction of an eye gaze, and a time duration of the consumer wearing the merchandise item.

18. The apparatus of claim 17, wherein while detecting the behavior patterns for the consumer, the computer system is configured to:
   determine a portion of the merchandise item being gazed upon by the consumer based in part on the determined eye gaze direction; and
   determine an interest level of the consumer for the portion of the merchandise item.

19. The apparatus of claim 17, wherein while detecting the behavior patterns for the consumer, the computer system is configured to:
   determine a correlation between two merchandise items that are worn simultaneously by the consumer.

20. The apparatus of claim 15, further comprising one or more of: a radio-frequency identifier (RFID) reader, and a barcode scanner;
   wherein while identifying the merchandise item, the computer system is configured to perform one or more of the following operations: configuring the RFID reader to scan an RFID tag, configuring the barcode scanner to scan a barcode, and extracting a feature from the one or more sequential images.

21. The apparatus of claim 15, wherein while determining the demographic group associated with the consumer, the computer system is configured to determine one or more of: an age, a gender, an ethnicity, a physical appearance, a body characteristic, and a market segment.

* * * * *